United States Patent [19]

Lee et al.

[11] Patent Number: 4,467,784
[45] Date of Patent: Aug. 28, 1984

[54] BOIL-OVER PREVENTER

[76] Inventors: Helena M. Lee; Robert K. Lee, both of 1312 Parsnip Crescent, Prince George, British Columbia, Canada, V2M 4C4

[21] Appl. No.: 472,569

[22] Filed: Mar. 7, 1983

[51] Int. Cl.³ .............................................. A47T 27/58
[52] U.S. Cl. .................................... 126/384; 126/381; 220/367; 220/4 A
[58] Field of Search ........... 126/373, 383, 384, 299 C, 126/381, 385, 386; 220/367, 368, 369, 370, 374, 4 A

[56] References Cited

U.S. PATENT DOCUMENTS

| 504,243 | 8/1893 | Philippot | 126/384 |
|---|---|---|---|
| 526,712 | 10/1894 | Johnston | 126/385 X |
| 890,203 | 6/1908 | Vaughan et al. | 126/384 |
| 934,991 | 9/1909 | Buehl | 126/384 |
| 1,461,366 | 7/1923 | Mulford et al. | 126/384 |
| 1,468,908 | 9/1923 | Krafft | 126/384 |
| 1,505,980 | 8/1924 | Stolitzka | 126/384 |
| 2,385,594 | 9/1945 | Witte | 126/384 |
| 2,925,082 | 2/1960 | Brownrigg | 126/383 |
| 3,465,745 | 9/1969 | Butler | 126/384 |
| 3,809,064 | 6/1974 | Ziegler | 126/381 |
| 3,937,210 | 2/1976 | Kachaylo | 126/384 |
| 4,298,131 | 11/1981 | Saito et al. | 126/384 X |

FOREIGN PATENT DOCUMENTS

| 26919 | 11/1920 | Denmark | 126/384 |
|---|---|---|---|
| 696673 | 8/1940 | Fed. Rep. of Germany | 126/384 |
| 81108 | 5/1919 | Switzerland | 126/384 |

Primary Examiner—Samuel Scott
Assistant Examiner—Margaret A. Focarino

[57] ABSTRACT

An apparatus for preventing fluid from boiling over the top edge of a cooking pot. The invention comprises a hollow cone having an open base and an open top, and spring clips for attaching the cone to the cooking pot's lid. Using the invention it is possible to boil such foods as rice without having the contents of the cooking pot boil over.

1 Claim, 4 Drawing Figures

BOIL-OVER PREVENTER

BACKGROUND OF THE INVENTION

This invention is related to cooking pots and, more particularly, is directed towards an apparartus which, when placed in a cooking pot, restrains fluid in the pot from boiling over the top edge of the pot.

When boiling a food, such as rice, in a cooking pot, one often experiences a problem with fluid in the pot boiling over and messing up the stove top and the stove element. This problem is particularly acute with foods which must be boiled or simmered for a number of minutes and which have a tendency to create a froth when they are subjected to heat. Rice is notable for being like this, and it is especially difficult to cook properly because lifting the pot's lid and giving the rice a stir whenever it bubbles over has the undesirable effect of making the rice taste tough rather than light and fluffy when it is served. In fact, rice companies put specific directions on the rice box: when the rice is cooking, don't lift the lid, no peeking, no stirring. This almost inevitably results in the rice boiling over, even when the heat is turned quite low, and the person is left with spills on the stove which rapidly dry on and which are extraordinarily difficult to remove. Often the stove element must be removed and the recess beneath the element thoroughly scrubbed.

SUMMARY OF THE INVENTION

Our invention is an apparatus for restraining fluid in a cooking pot from boiling over the top edge of the pot.

One embodiment of the invention comprises a hollow cone manufactured of heat-resistant material, the cone having an open base and an open top, and spring clips for releasably attaching the cone to the lid of the cooking pot.

Another embodiment of the invention comprises a cone, spring clips for releasably attaching the cone to the lid of the pot, and a ring-shaped baffle plate. The ring-shaped baffle plate is fastened to the cone such that it is coaxial with, and at least one-half centimeter posterior to, the base of the cone. The baffle plate has an outer diameter slightly less than the inside diameter of the pot.

Yet another embodiment of the invention comprises a cone, a pot lid which fits the cooking pot, and one or more connecting members which fasten the cone to the lid.

DESCRIPTION OF THE PREFERRED EMBODIMENTS

Figure 1:
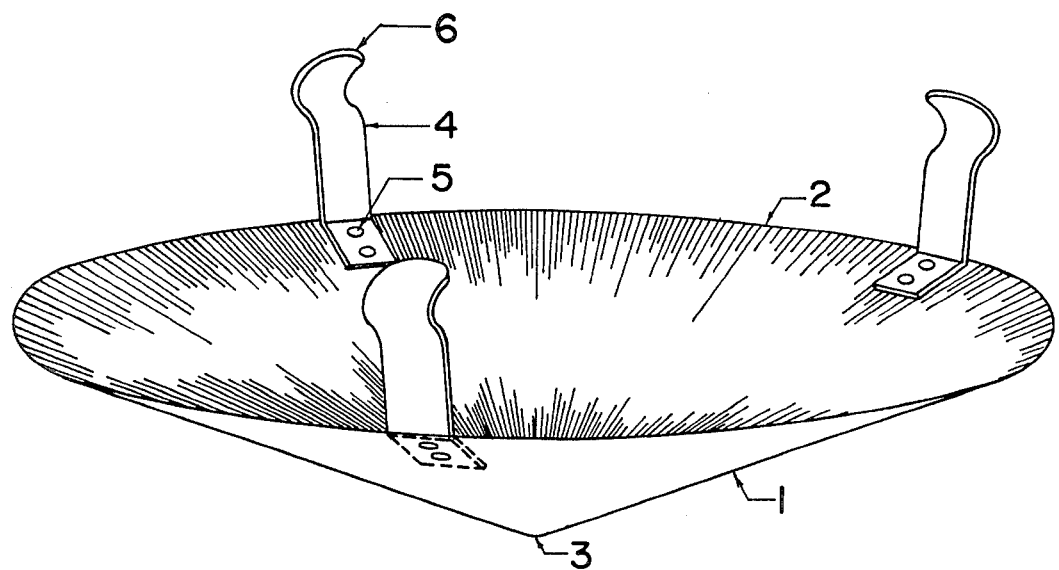
FIG. 1 is a side view of a preferred embodiment of the invention, showing a cone and three identical spring clips, the spring clip on the right side of the drawing shown in profile.
Figure 2:
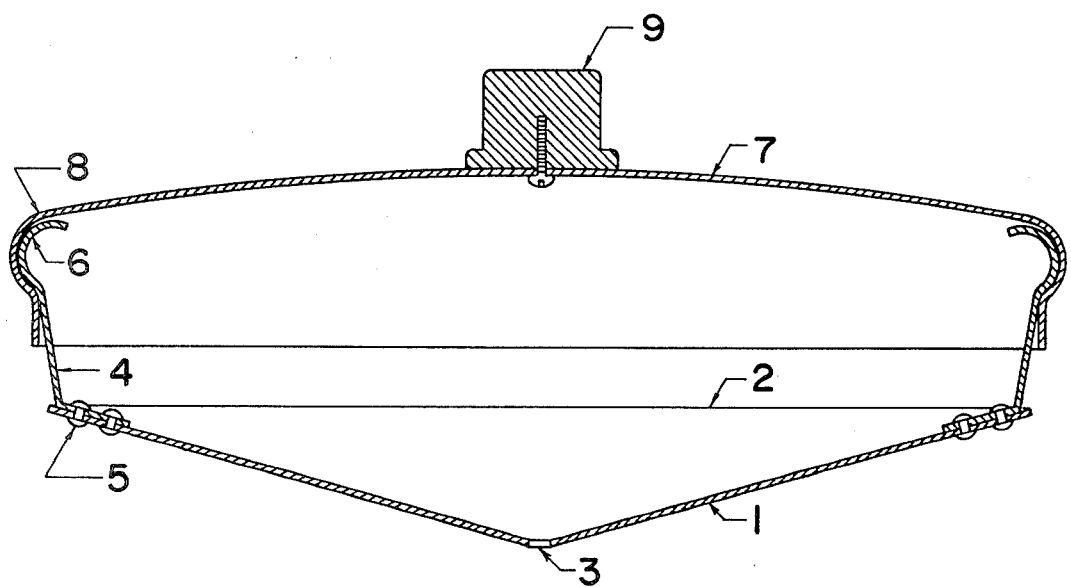
FIG. 2 is a side view of the embodiment of the invention shown in FIG. 1 attached to a pot lid, the near portion of the invention and the pot lid cut away at the broken lines to show the interior of the lid and the coupling of the spring clips therewith.

A preferred embodiment of the invention is illustrated in FIG. 1 of the drawings. The embodiment shown in FIG. 1 includes a hollow truncated cone 1 manufactured of thin metal, the base 2 of the cone 1 being open, and the top 3 or apex of the cone 1 also being open. The diameter of the base 2 of the cone 1 is slightly less than the inside diameter of the size of cooking pot or saucepan that the cone 1 is manufactured to be used with. The opening in the top 3 of the cone 1 is about one-half centimeter across. The sides of the cone 1 have a slope of about fifteen degrees. Attached equidistantly around the edge of the base 2 of the cone 1, and extending away therefrom, are three metal spring clips 4 made from resiliently flexible metal strips. One end of each spring clip 4 is attached to the cone 1 with rivets 5. Each spring clip's outer end 6, distal to the cone 1, is partially curled to create a bulbous shape. The cone 1 is quickly and easily attached to the pot's lid 7 by manually springing the spring clips 4 towards each other and placing the clips' bulbous ends 6 against the concave groove 8 present on the inside surface of the rim of most pot lids of common manufacture. Thus, the metal cone 1 is releasably attached or clipped to the pot's lid 7 by use of the spring clips 4, as shown in FIG. 2. When the lid 7 is placed on the cooking pot, the metal cone 1 is held inverted in the interior of the pot. The entire cone 1 is then situated below the top edge of the pot, with space being maintained between the cone 1 and the bottom of the pot.

We have found that problems with fluids boiling over during cooking are reduced when a hollow metal cone, such as that described, is attached to the cooking pot's lid. The cone is situated above the food and liquid contents of the cooking pot. The froth and bubbling that is associated with cooking rice and other foods is held back or restrained from rising over the top edge of the pot by the inverted cone. Instead of overflowing the cooking pot, the boiling fluid rises up the inside walls of the pot, and then trickles down the interior of the cone and through the small opening in the apex of the cone. For best results, the base of the cone should fit quite closely to the inside walls of the cooking pot, yet the cone should not be difficult to remove from the pot. Lifting the lid's handle 9 serves to raise both the lid 7 and the cone 1 from the cooking pot.

Figure 3:
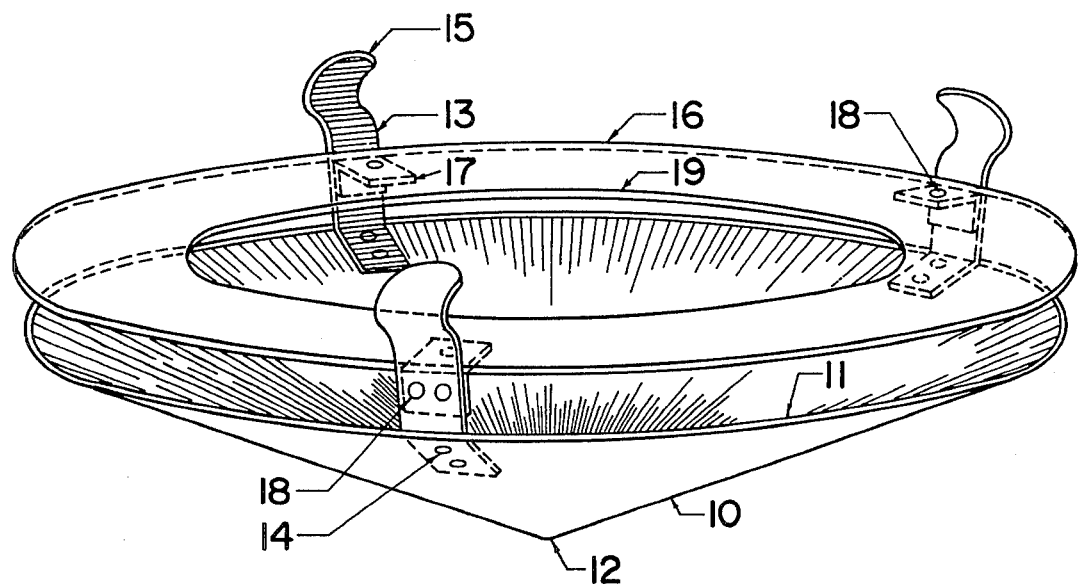
FIG. 3 is a side view of a second embodiment of the invention.

A second embodiment of our invention is shown in FIG. 3. It comprises a hollow truncated metal cone 10 having an open base 11 and an open top 12, and three spring clips 13 attached with rivets 14 to the cone 10. The spring clips 13 have bulbous distal ends 15. This embodiment further comprises a ring-shaped baffle plate 16 attached, by means of small metal brackets 17 and rivets 18, to the three spring clips 13 such that the ring-shaped baffle plate 16 is situated coaxial with the base 11 of the cone 10 and about two centimeters posterior to (behind) the base 11 of the cone 10. The outer diameter of the ring-shaped baffle plate 16 should be slightly less than the inside diameter of the size of cooking pot that the cone 10 is manufactured to be used with. The diameter of the baffle plate's 16 inner opening 19 is about ten centimeters. The apparatus can be releasably attached to the pot's lid by springing the spring clips 13 towards each other and placing their bulbous distal ends 15 against the concave groove in the rim of the lid. When the lid is placed on the cooking pot, the ring-shaped baffle plate 16 is situated below the top edge of the pot. Space is present between the cone 10 and the bottom of the pot. The ring-shaped baffle plate 16 helps the metal cone 10 to restrain boiling fluid from rising over the top edge of the cooking pot. The baffle plate 16 is situated above the cone 10 in the pot.

Figure 4:
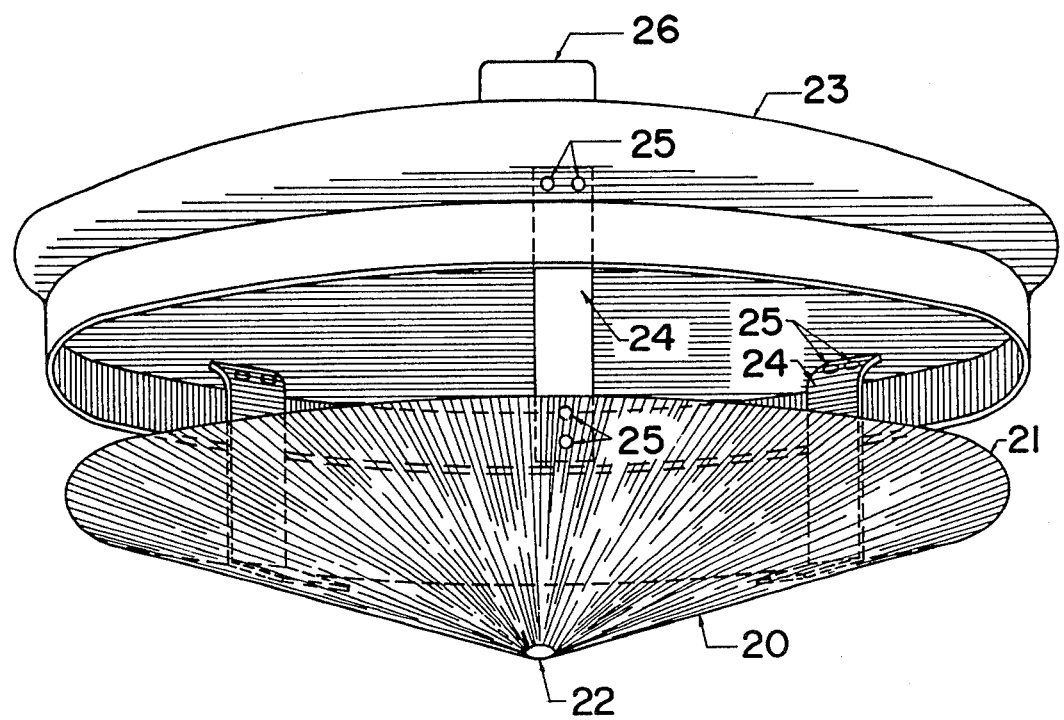
FIG. 4 is a side view of a third embodiment of the invention.

A third embodiment of our invenion is shown in FIG. 4. Like the other two embodiments described it includes a hollow truncated metal cone 20 having an open base 21 and an open top 22 or apex. The diameter of the base 21 of the cone 20 should be slightly less than the inside diameter of the size of cooking pot the cone 20 is manufactured to be used with. The opening in the top 22 of the cone 20 is about one-half centimeter across. A pot lid 23, which fits the cooking pot, is permanently attached to the metal cone 20 by use of one or more connecting members. Three metal strips 24 could serve as the connecting members, as shown in FIG. 4. One end of each metal strip 24 is attached to the lid 23 with rivets 25; the other end of each metal strip 24 is attached to the cone 20 with rivets 25. The metal cone 20 and the lid 23 are thus inseparably joined. When the lid 23 is placed on the cooking pot, the cone 20 is held inverted in the interior of the pot. The entire cone 20 is then situated below the top edge of the cooking pot, with space being maintained between the cone 20 and the bottom of the pot. Lifting the lid's handle 26 removes the lid 23 and the metal cone 20 from the cooking pot.

The three above described embodiments of our invention are all used with the metal cone inverted in the upper region of the interior of a cooking pot. The entire cone should be above the food and liquid contents of the cooking pot. Standard cooking procedure for the type of food in the pot should be followed. Using our invention, we have found that rice, in particular, has an improved texture and flavor.

We claim:

1. An apparatus for restraining fluid in a standard saucepan, provided with a standard saucepan lid, from boiling over the top edge of said saucepan, comprising:
    (a) a hollow cone-like means for directing all rising froth bubbles in the saucepan to the sides of the saucepan and then breaking said bubbles below the top edge of the saucepan and returning all resultant fluid to the bottom of the saucepan, said cone fitting entirely within said saucepan, the outermost edges of said cone fitting in close tolerance to the inside walls of the saucepan, said cone having an open base and and open vertex, the opening in the vertex of said cone being at most one centimeter in diameter;
    (b) at least two elongated springclip-like means for suspending said cone totally inside the saucepan from the saucepan lid and maintaining said cone in an inverted position within the saucepan while permitting the saucepan lid to seat directly upon the saucepan, said elongated springclips each having one end permanently attached to the base of said cone; and
    (c) means for engaging said springclips with the inner curvature of said standard saucepan lid, said engaging means being located at the distal ends of said springclips.

* * * * *